US006625177B1

(12) United States Patent
Raza

(10) Patent No.: US 6,625,177 B1
(45) Date of Patent: Sep. 23, 2003

(54) CIRCUIT, METHOD AND/OR ARCHITECTURE FOR IMPROVING THE PERFORMANCE OF A SERIAL COMMUNICATION LINK

(75) Inventor: S. Babar Raza, Milpitas, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 09/370,262

(22) Filed: Aug. 9, 1999

(51) Int. Cl.⁷ .................................................. H04J 3/12
(52) U.S. Cl. ........................ 370/522; 370/230; 370/458; 370/508; 375/327; 375/376
(58) Field of Search ................................ 370/230, 233, 370/236, 442, 444, 458, 463, 508, 522, 235, 395.1, 395.2, 395.3, 394.42, 389; 375/215, 293, 294, 327, 373, 376

(56) References Cited

U.S. PATENT DOCUMENTS

| | | | |
|---|---|---|---|
| 4,119,805 A | * 10/1978 | Pratelli ..................... 179/18 FC |
| 4,956,839 A | 9/1990 | Torii et al. ..................... 370/60 |
| 5,101,404 A | 3/1992 | Kunimoto et al. ............. 370/60 |
| 5,247,671 A | 9/1993 | Adkins et al. ............... 395/650 |
| 5,251,206 A | 10/1993 | Calvignac et al. ......... 370/60.1 |
| 5,280,591 A | 1/1994 | Garcia et al. ................ 395/325 |
| 5,313,591 A | 5/1994 | Averill ......................... 395/325 |
| 5,319,754 A | 6/1994 | Meinecke et al. ........... 395/325 |
| 5,321,691 A | 6/1994 | Pashan ........................ 370/58.3 |
| RE34,896 E | 4/1995 | Calvignac et al. ............. 370/84 |
| 5,408,469 A | 4/1995 | Opher et al. ................ 370/60.1 |
| 5,418,781 A | 5/1995 | Kaufman et al. .............. 370/60 |
| 5,428,603 A | * 6/1995 | Kivett ........................... 370/24 |
| 5,436,893 A | 7/1995 | Barnett ....................... 370/60.1 |
| 5,438,681 A | 8/1995 | Mensch, Jr. ................. 395/800 |
| 5,440,549 A | 8/1995 | Min et al. ...................... 370/60 |
| 5,440,698 A | 8/1995 | Sindhu et al. .......... 395/200.08 |
| 5,446,726 A | 8/1995 | Rostoker et al. ............. 370/232 |
| 5,450,398 A | 9/1995 | Abefelt et al. .............. 370/60.1 |
| 5,452,259 A | 9/1995 | McLaury ................ 365/230.05 |
| 5,459,840 A | 10/1995 | Isfeld et al. ................. 395/309 |
| 5,469,545 A | 11/1995 | Vanbuskirk et al. ... 395/200.01 |
| 5,487,170 A | 1/1996 | Bass et al. ................... 395/732 |
| 5,499,239 A | 3/1996 | Munter ....................... 370/60.1 |
| 5,504,741 A | 4/1996 | Yamanaka et al. ......... 370/58.2 |
| 5,537,400 A | 7/1996 | Diaz et al. .................. 370/58.2 |
| 5,546,384 A | * 8/1996 | Dupuy et al. .................. 370/50 |
| 5,577,032 A | 11/1996 | Sone et al. .................. 370/58.3 |
| 5,577,035 A | 11/1996 | Hayter et al. .................. 370/60 |
| 5,579,278 A | 11/1996 | McLaury ................ 365/230.05 |
| 5,581,713 A | 12/1996 | Myers et al. ................ 395/299 |
| 5,583,858 A | 12/1996 | Hanaoka ..................... 370/392 |
| 5,617,367 A | 4/1997 | Holland et al. ............. 365/219 |
| 5,634,074 A | 5/1997 | Devon et al. ............... 395/828 |
| 5,640,675 A | * 6/1997 | Pinault et al. .............. 455/33.1 |
| 5,654,968 A | 8/1997 | Smiroldo ..................... 370/443 |
| 5,668,807 A | 9/1997 | SChachar et al. ........... 370/378 |
| 5,673,132 A | 9/1997 | Carbone, Jr. et al. ....... 359/177 |
| 5,724,351 A | 3/1998 | Chao et al. .................. 370/395 |
| 5,724,358 A | 3/1998 | Headrick et al. ........... 370/418 |
| 5,787,095 A | 7/1998 | Myers et al. ................ 371/68.1 |
| 5,790,539 A | 8/1998 | Chao et al. .................. 370/390 |
| 5,793,764 A | 8/1998 | Bartoldus et al. ........... 370/390 |
| 5,799,014 A | 8/1998 | Kozaki et al. ............... 370/358 |
| 5,802,052 A | 9/1998 | Venkataraman ............. 370/395 |
| 5,835,498 A | 11/1998 | Kim et al. ................... 370/537 |
| 5,844,887 A | 12/1998 | Oren et al. .................. 370/218 |
| 5,850,395 A | 12/1998 | Hauser et al. ............... 370/398 |

(List continued on next page.)

*Primary Examiner*—Dang Ton
*Assistant Examiner*—Shick Hom
(74) *Attorney, Agent, or Firm*—Christopher P. Maiorana, P.C.

(57) ABSTRACT

A method for receiving and transmitting one or more data packets comprising the steps of (A) receiving and transmitting the one or more data packets in response to one or more control signals and (B) generating the one or more control signals in response to the one or more data packets.

17 Claims, 3 Drawing Sheets

U.S. PATENT DOCUMENTS

| | | | |
|---|---|---|---|
| 5,852,606 A | 12/1998 | Prince et al. | 370/393 |
| 5,857,111 A * | 1/1999 | Oda | 395/800.11 |
| 5,875,190 A | 2/1999 | Law | 370/395 |
| 5,912,889 A | 6/1999 | Preas et al. | 370/359 |
| 5,991,295 A | 11/1999 | Tout et al. | 370/376 |
| 6,215,769 B1 | 4/2001 | Ghani et al. | 370/230 |
| 6,246,682 B1 | 6/2001 | Roy et al. | 370/390 |
| 6,295,295 B1 * | 9/2001 | Wicklund | 370/392 |
| 6,339,596 B1 | 1/2002 | Kozaki et al. | 370/395 |

* cited by examiner

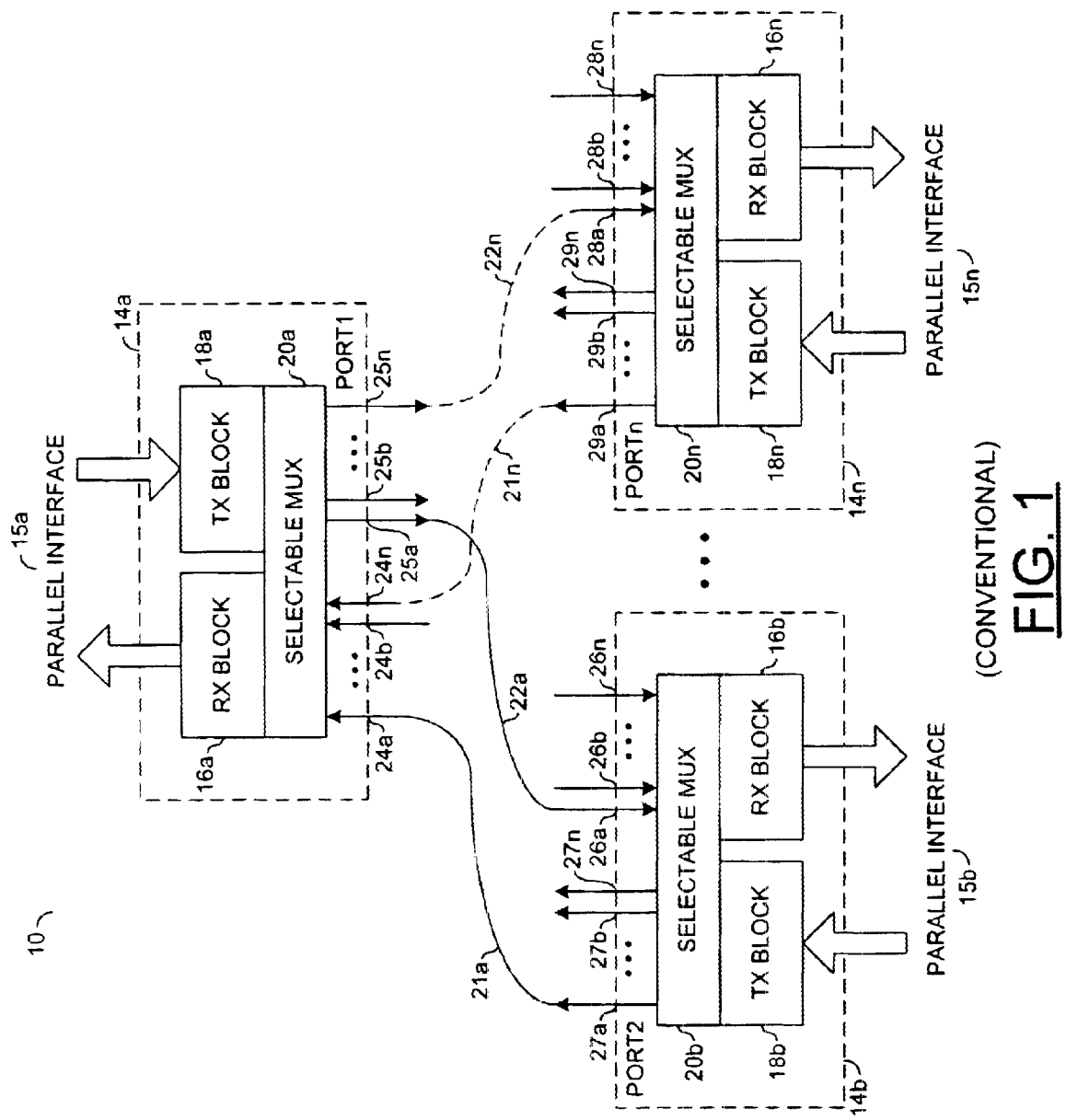
FIG. 1 (CONVENTIONAL)

CIRCUIT, METHOD AND/OR ARCHITECTURE FOR IMPROVING THE PERFORMANCE OF A SERIAL COMMUNICATION LINK

CROSS TO RELATED APPLICATIONS

The present invention may relate to co-pending applications Ser. No. 09/347,830, filed Jul. 2, 1999, Ser. No. 09/347,046, filed Jul. 2, 1999 and Ser. No. 09/347,045, filed Jul. 2, 1999, which are each hereby incorporated by reference in their entirety.

FIELD OF THE INVENTION

The present invention relates to communication devices generally and, more particularly, to a circuit, method and/or architecture for improving the performance of a serial communication link.

BACKGROUND OF THE INVENTION

Referring to FIG. 1, a block diagram illustrating a communications circuit 10 is shown. The circuit 10 comprises a number of ports 14a–14n. Each of the ports 14a–14n comprises receive block 16, a transmit block 18 and a multiplexer 20.

The ports 14a–14n are connected to each other via serial links 21a–21n and 22a–22n. The ports 14a–14n each comprise serial inputs 24a–24n, 26a–26n and 28a–28n, and serial outputs 25a14 25n, 27a–27n and 29a–29n, respectively. The serial connection from each port 14a–14n to another port 14a–14n is in both directions (i.e., both receive and transmit communication). The data arrives in the transmit block 18a–18n from a parallel interface 15a–15n, respectively, for each port 14a–14n. The data is then transmitted through a selectable multiplexer 20a–20n to the serial outputs 25a–25n, 27a–27n and/or 29a–29n. The serial outputs 25a–25n, 27a–27n and/or 29a–29n transmit the data to one of the serial communication links 22a–22n.

For the receive side, the data is received from one of the serial communication links 21a–21n or 22a–22n at the serial input 24a–24n, 26a–26n and/or 28a–28n and passed through the selectable multiplexer 20a–20n to the receive (RX) block 16. The receive block 16 then passes the data to one of the parallel interfaces 15a–15n.

The selectable multiplexers 20a–20n can be configured by management registers or by interface pins. When the connection from a particular port 14a–14n for either transmit or receive needs to be changed, the configuration interface or the configuration registers pass this new information to the particular selectable multiplexers 20a–20b. For the receive side, the receiver 16 has to wait for a period of time to acquire a lock.

The performance of the circuit 10 is significantly reduced since the amount of time to acquire a lock to a new port is of the order of the time it takes to send a block of data. Such a condition occurs in data communication switches.

SUMMARY OF THE INVENTION

The present invention concerns a method for receiving and transmitting one or more data packets comprising the steps of (A) receiving and transmitting the one or more data packets in response to one or more control signals and (B) generating the one or more control signals in response to the one or more data packets.

The objects, features and advantages of the present invention include providing a communication device that may (i) eliminate a lock time between successive transfers, (ii) improve the overall performance of the device, and/or (iii) conserve power.

BRIEF DESCRIPTION OF THE DRAWINGS

These and other objects, features and advantages of the present invention will be apparent from the following detailed description and the appended claims and drawings in which:

FIG. 1 is a block diagram of a conventional communication device;

DETAILED DESCRIPTION OF THE PERFERRED EMBODIMENTS

Figure 2:
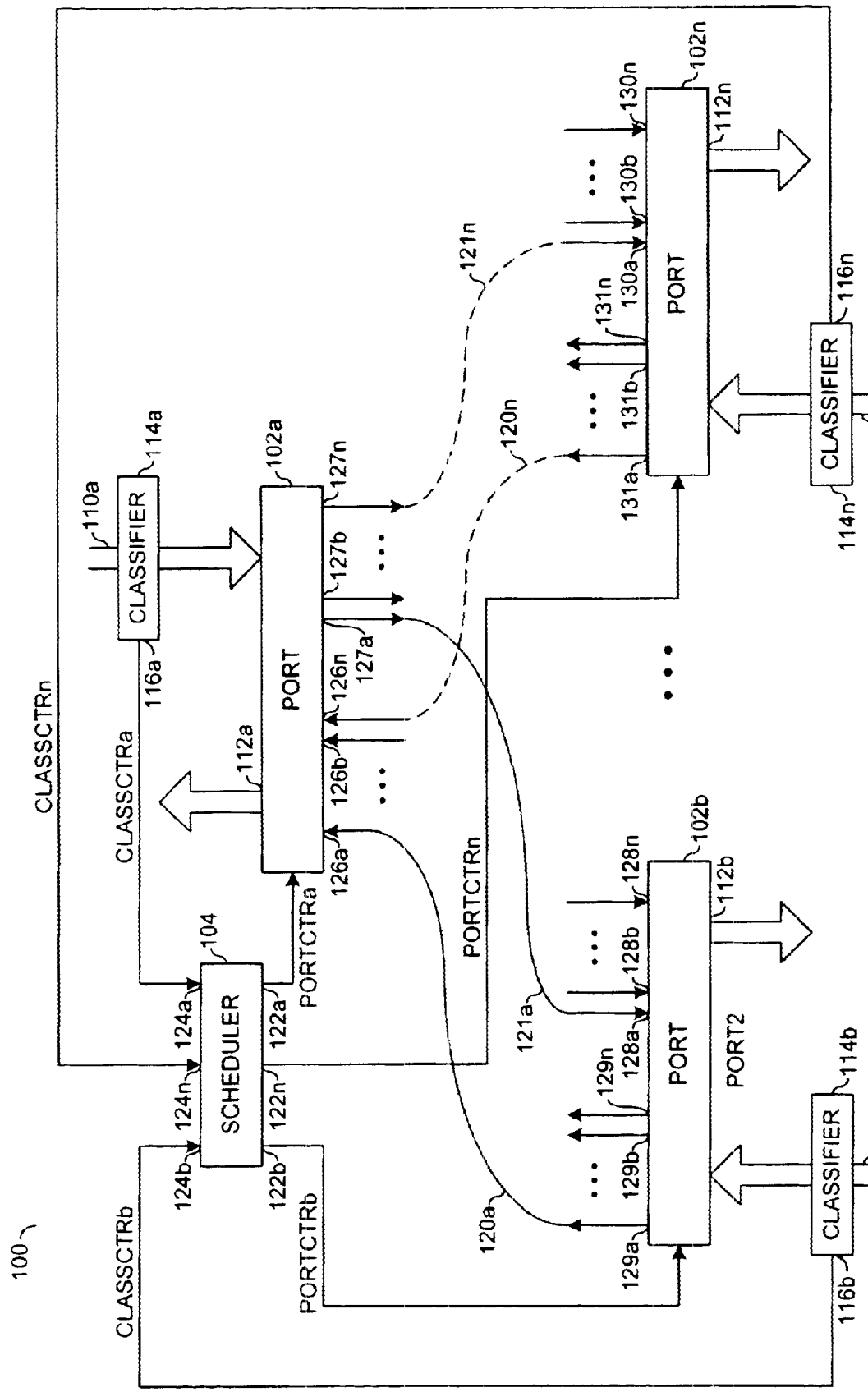
FIG. 2 is a block diagram of a preferred embodiment of the present invention.

Referring to FIG. 2, a block diagram of a circuit 100 is shown in accordance with a preferred embodiment of the present invention. The circuit 100 generally comprises a number of ports 102a–102n and a circuit 104. In one implementation, circuit 104 may be a scheduler circuit. The ports 102a–102n may have one or more input streams at inputs 110a–110n and one or more output streams at outputs 112a–112n, respectively. The inputs 110a–110n and the outputs 112a–112n may be considered a parallel interface.

Each of input streams 110a–110n may be connected to one of the ports 102a–102n through one or more classifier circuits 114a–114n. The classifier circuits 114a–114n may look at information embedded within one or more data packets (e.g., multicast information, destination information, priority information, etc.) to generate one or more signals (e.g., classifier control signals CLASSCTRa-n) at one or more outputs 116a–116n. The classifier control signals CLASSCTRa-n may determine the appropriate outgoing port 102a–102n as well as the priority of the traffic in the appropriate port 102a–102n. The packet classifiers 114a–114n may determine the priority of the data packet as well as the number of destination ports 102a–102n from the information embedded in the data packets.

The scheduler 104 is generally configured to present a plurality of port control signals (e.g., PORTCTRa–n) in response to a number of control signals (e.g., CLASSCTRa–n). The port control signals PORTCTRa—n may comprise a first and second list. The first and second list may indicate (i) which port to transfer and/or receive the packet of data to and/or from, and (ii) the order to transfer the data packets within each port.

The ports 102a–102n generally communicate the data packets to each other through a plurality of serial links 120a–120n and/or 121a–121n. The present invention may have a number of serial links (e.g., P), where P is an integer. The number of serial links P depends on the number of ports 102a–102n. The ports 102a–102n may be configured to both transfer and receive the data packets. The data packets may be presented in an order determined in response to one of the plurality of control signals PORTCTRa-n presented at the outputs 122a–122n. The ports 102a–102b may present data packets to the outputs 112a–112n.

Each of ports 102a–102n may comprise a (i) plurality of serial inputs 126a–126n, 128a–128n and 130a–130n, and (ii) a plurality of serial outputs 127a–127n, 129a–129n and 131a–131n, respectively. One or more of the serial inputs 126a–126n of the port 102a may be connected to the serial links 120a–120n. One or more of the serial links 120a–120n may also be connected to one or more of the serial outputs 129a–129n of the port 102b and one or more of the serial outputs 131a–131n of the port 102n. One or more of the serial links 121a–121n may be connected to the serial outputs 127a–127n of the port 102a. The serial links 120a–120n and 121a–121n may allow the packets of data to be transferred and/or received by one or more of the ports 102a–102n. The transferred data packets generally become outgoing data. The ports 102a–102n may receive and transfer the outgoing data packets over the outputs 112a–112n.

Figure 3:
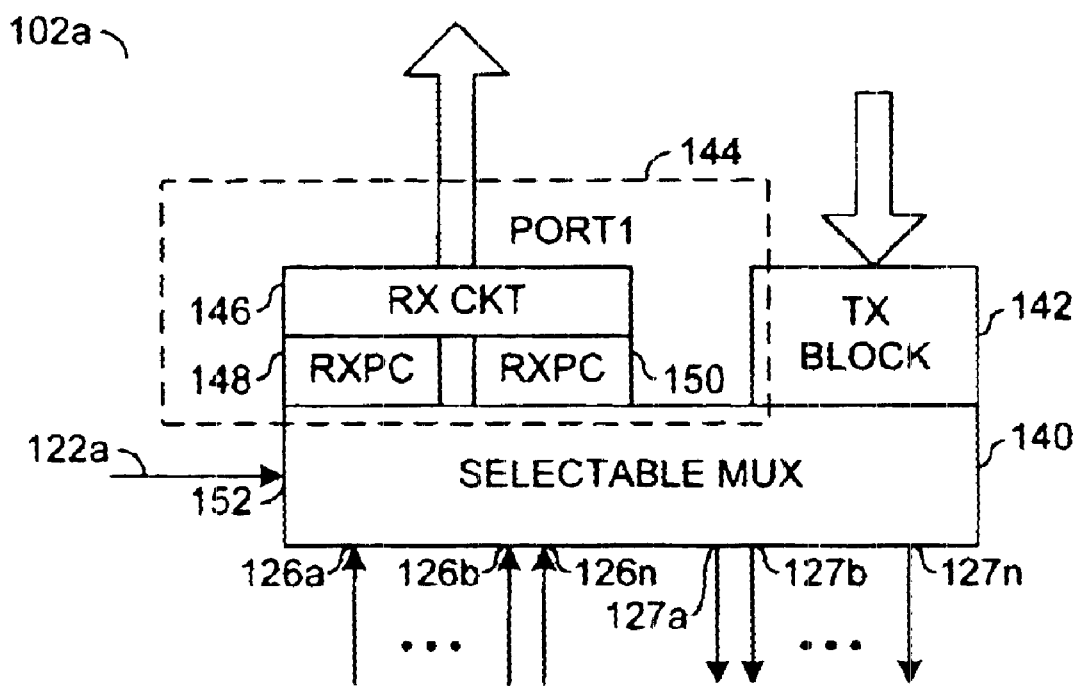
FIG. 3 is a more detailed block diagram of one of the a ports of FIG. 2.

Referring to FIG. 3, a detailed block diagram of an exemplary port 102a is shown. Each of the ports 102a–102n generally comprise a selectable multiplexer 140, a transmit block (or circuit) 142 and a receive block (or circuit) 144. The receive circuit 144 generally comprises a receiver circuit (e.g., RX) 146 that may include a multiplexer circuit, a select circuit, serial to parallel converter, etc., a first receive circuit (e.g., RXPC) 148 and a second receive circuit (e.g., RXPC) 150. In one example, the first receive circuits 148a–148n and the second receive circuits 150a–150n may be receive PLL circuits. The selectable multiplexer 140 may be configured by the scheduler 104, through management registers or through interface pins. When the connection from a particular port 102a–102n for either transmit or receive needs to be changed, the configuration interface or the configuration registers may pass this new information to the particular port 102a–102n.

The classifier circuits 114a–114n have been described in the context of separate circuits. However, the particular classifier circuits 114a–114n may be embedded into the transmit blocks 142a–142n. In such an example, the transmit circuits 142a–142n and the classifier circuits 114a–114n may be implemented as a single integrated circuit. More specifically, the classifier circuit 114a and the transmit circuit 142a may be implemented as a single integrated circuit within the port 102a. However, independently implemented transmit circuits 142a–142n and classifier circuits 114a–114n may be implemented to meet the design criteria of a particular implementation.

The selectable multiplexer 140a may receive data packets from the serial inputs 126a–126n. The ports 102b–102n are generally connected to the port 102a through the serial links 120a–120nand 121a–121n. One or more of the serial links 120a–120n are generally connected to the serial inputs 126a–126n of the port 102a. The selectable multiplexer 140a may transmit data through the serial outputs 127a–127n. The selectable multiplexer 140a may receive data through the serial inputs 126a–126n. The selectable multiplexer 140a may transmit or receive data packets in response to the port control signal PORTCTRa received at an input 152 from the scheduler 104. The selectable multiplexer generally presents the data packets to the receive circuit 144.

The data packet within the first receive PLL circuit 148a–148n may be multiplexed to the ports 102a–102n through the serial connections 121a–121n. The selectable multiplexers 140a–140n are generally controlled by port control signals PORTCTRa–n generated by the scheduler 104. The scheduler 104 may synchronize the operation of all the ports 102a–102n, in response to the classifier control signals CLASSCTRa–n. A slot time may be defined as the time it takes to transfer a fixed block of data from one of the ports 102a–102n to another one of the ports 102a–102n.

The scheduler 104 may configure the selectable multiplexers 140a–140n in the ports 102a–102n for a first slot time. The circuit 100 may use the scheduler 104 to look ahead by one slot time and set the selectable multiplexers 140a–140n for a second slot time. The port 102a–102n may receive the data packet in the first slot time and transmit the data packet during the second slot time to one or more of the ports 102a–102n. One of the receive PLL circuits 148a–148n or 150a–150n may be connected to one of the receiver circuits 146a–146n of the ports 102a–102n to perform the receive data function. However, a second one of the receive PLL circuits 148a–148n and/or 150a–150n may start listening to the particular one of the ports 102a–102n for the transmission that will occur in the next slot time. This look ahead may allow the lock time to overlap with the reception of data and may eliminate the receive lock time for back–to–back transfers.

In one example, if the lock time is in the order of the packet transmit time, two receive PLL circuits 148a–148n and 150a–150n may be sufficient to reduce lock time. However, if the lock time is in the order of 10 times the transmit time, then more receive PLL circuits M, where M is an integer, may be needed. For example, 10 receive PLL circuits may be implemented. The particular number of receive circuits 148a–148n and 150a–150n may be implemented accordingly to meet the design criteria of a particular implementation.

For the transmit side, the selectable multiplexers 140a–140n may enable transmission on one or more serial outputs 127a–127n, 128a–128n and/or 131a–131n. One of the serial links 120a–120n and 121a–121n may carry the data packet for the current slot time and another of the serial links 120a–120n and 121a–121n may send the data packet in the next slot time. The present invention may significantly improve the performance of the ports 102a–102n by eliminating (or reducing) the lock time.

While the invention has been particularly shown and described with reference to the preferred embodiments thereof, it will be understood by those skilled in the art that various changes in form and details may be made without departing from the spirit and scope of the invention.

What is claimed is:

1. A method for receiving and transmitting data packets comprising the steps of:

(A) receiving and transmitting said data packets in response to one or more control signals, wherein (i) one or more first data packets are transmitted to a first communication device configured to receive said one or more first data packets during a first slot time and a second communication device configured to receive said one or more first data packets during a second slot time and (ii) one or more second data packets are received from a third communication device configured to transmit said one or more second data packets during said first slot time and a fourth communication device configured to transmit said one or more second data packets during said second slot time;

(B) generating said one or more control signals in response to said one or more first and said one or more second data packets; and (C) coupling said third communications device and said fourth communication device to a first receive PLL circuit and a second receive PLL circuit, respectively, in response to said one or more control signals.

2. The method according to claim 1, wherein said one or more control signals are generated in response to information embedded in one or more of said one or more first data packets.

3. The method according to claim 2, wherein each of said one or more control signals comprises a first list and second list.

4. The method according to claim 3, wherein step (A) further comprises presenting said one or more first data packets in response to said first and second lists.

5. The method according to claim 4, wherein said first list operates during said first slot time and said second list operates during said second slot time.

6. The method according to claim 3, wherein said embedded information contains multicast information.

7. The method according to claim 3, wherein said embedded information contains data priority information.

8. The method according to claim 5, wherein said embedded information further contains data priority information.

9. A method for receiving and transmitting data packets comprising the steps of:

(A) receiving and transmitting said data packets in response to one or more control signals, wherein (i) one or more first data packets are transmitted to a first communications device configured to receive said one or more first data packets during a first slot time and a second communication device configured to receive said one or more first data packets during a second slot time and (ii) one or more second data packets are received from a third communication device configured to transmit said one or more second data packets during said first slot time and a fourth communications device configured to transmit said one or more second data packets during said second slot time;

(B) generating said one or more second control signals in response to said one or more first and said one or more second data packets;

(C) generating said one or more first control signals in response to said one or more second control signals; and (D) coupling said third communications device and said fourth communication device to a first receive PLL circuit and a second receive PLL circuit, respectively, in response to said one or more first control signals.

10. The method according to claim 9, wherein said one or more second control signals are generated in response to information embedded in one or more of said one or more first data pockets.

11. The method according to claim 9, wherein each of said one or more second control signals comprise a first list and a second list.

12. The method according to claim 11, wherein said first list operates during said first slot time and said second list operates during said second slot time.

13. The method according to claim 10, wherein said embedded information contains one or more multicast information, destination information, and data priority information.

14. The method according to claim 10, further comprising the step of:

coupling a transmit circuit to a plurality of serial links in response to said embedded information.

15. The method according to claim 10, further comprising the step of:

coupling a receive circuit to a plurality of serial links in response to said embedded information.

16. The method according to claim 1, further comprising the step of:

coupling a transmit circuit to said first and second communication devices in response to said one or more control signals.

17. The method according to claim 1, further comprising the steps of:

presenting said one or more second data packets received from said third communication device to an output stream; and listening to said fourth communication device while receiving said one or more data second packets from said third communications device.

* * * * *